US012671005B2

(12) United States Patent
Robertson et al.

(10) Patent No.: US 12,671,005 B2

(45) Date of Patent: Jun. 30, 2026

(54) INTERNALS LIFTING DEVICE

(71) Applicant: Rolls-Royce SMR Limited, Derby (GB)

(72) Inventors: Daniel Robertson, Derby (GB); Euan Sharp, Derby (GB); Gerard Halliday, Derby (GB); Stephen Calvert, Derby (GB); Matthew Morris, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 324 days.

(21) Appl. No.: 18/254,016

(22) PCT Filed: Nov. 12, 2021

(86) PCT No.: PCT/EP2021/081545

§ 371 (c)(1),
(2) Date: May 23, 2023

(87) PCT Pub. No.: WO2022/117316

PCT Pub. Date: Jun. 9, 2022

(65) Prior Publication Data

US 2023/0420150 A1 Dec. 28, 2023

(30) Foreign Application Priority Data

Dec. 3, 2020 (GB) ...................................... 2019071

(51) Int. Cl.
*G21C 19/20* (2006.01)
*G21C 19/32* (2006.01)

(52) U.S. Cl.
CPC ........... *G21C 19/207* (2013.01); *G21C 19/32* (2013.01)

(58) Field of Classification Search
CPC ....... G21C 19/20; G21C 19/207; G21C 19/32
See application file for complete search history.

(56) References Cited

U.S. PATENT DOCUMENTS

| | | | | |
|---|---|---|---|---|
| 4,056,435 A * | 11/1977 | Carlier | G21C 19/20 976/DIG. 258 |
| 5,225,150 A * | 7/1993 | Malandra | G21C 11/00 376/263 |
| 5,761,260 A * | 6/1998 | Bergamaschi | G21C 7/12 376/233 |
| 6,198,787 B1 | 3/2001 | Hasegawa et al. | |
| 2003/0028065 A1 | 2/2003 | Matsunaga et al. | |
| 2005/0135539 A1 | 6/2005 | Joly et al. | |
| 2013/0294565 A1* | 11/2013 | Harkness | G21C 19/20 376/268 |
| 2015/0092904 A1 | 4/2015 | Carver et al. | |
| 2018/0166178 A1* | 6/2018 | Carver | G21F 5/14 |

FOREIGN PATENT DOCUMENTS

| | | | | |
|---|---|---|---|---|
| CN | 110010257 A * | 7/2019 | G21C 3/04 |
| CN | 110648774 A | 1/2020 | |
| DE | 2736208 A1 | 9/1978 | |
| GB | 2588842 A | 5/2021 | |
| JP | S62226098 A | 10/1987 | |
| JP | 2002-122694 A | 4/2002 | |
| JP | 2003172793 A | 6/2003 | |
| JP | 2004004038 A | 1/2004 | |
| JP | 2004069354 A | 3/2004 | |
| JP | 2016-206154 A | 12/2016 | |
| JP | 2016206087 A | 12/2016 | |
| WO | 2014009801 A2 | 1/2014 | |

OTHER PUBLICATIONS

Espacenet translation of Wang (Year: 2019).*
UKIPO Search Report, Application No. GB-2019071.6, dated May 20, 2021, 1 page.
International Search Report and Written Opinion, International Application No. PCT/EP2021/081545, European Patent Office—Searching Authority, mailed May 19, 2022, 15 pages.
Office Action, corresponding to JP 2023-534194, dated Sep. 9, 2025.
Office Action, corresponding to JP 2023-534194, dated Aug. 27, 2025.

* cited by examiner

*Primary Examiner* — Sharon M Davis
(74) *Attorney, Agent, or Firm* — Quarles & Brady LLP

(57) ABSTRACT

The present disclosure provides a lifting and transport device for lifting upper internals from a reactor core of a nuclear power generation system in a deployment location and transporting them to a storage location. The lifting/transport device comprises a device body formed of radioactive shielding material, the device body defining a storage chamber having an open base. The device further comprises a movable sealing plate formed of radioactive shielding material, the sealing plate being movable between an open position in which the storage chamber is open and a closed position in which the storage chamber is sealed. There is also a lifting system mounted within the storage chamber having a lifting rig for releasable connection to the upper internals and configured to raise the upper internals to within the storage chamber when the device is in the deployment location and the plate is in the open position. The device comprises wheels for guiding movement of the lifting/transport device between the deployment location and the storage location.

3 Claims, 2 Drawing Sheets

INTERNALS LIFTING DEVICE

RELATED APPLICATIONS

This application is a 35 U.S.C. § 371 national phase application of PCT/EP2021/081545 (WO-2022/117316 A1), filed on Nov. 12, 2021, entitled "INTERNALS LIFTING DEVICE", and claims priority to GB-2019071.6 filed on Dec. 3, 2020, both of which are incorporated herein by reference in their entirety.

TECHNICAL FIELD

The present disclosure relates to a device and method for removing upper internals from a reactor core in a nuclear power generation system during maintenance and refuelling operations.

BACKGROUND

Nuclear power plants convert heat energy from the nuclear decay of fissile material contained in fuel assemblies within a reactor core into electrical energy. Water-cooled reactor nuclear power plants, such as pressurised water reactor (PWR) plants, include a reactor pressure vessel (RPV) which contains the reactor core/fuel assemblies, and a turbine for generating electricity from steam produced by heat from the fuel assemblies.

PWR plants have a pressurised primary coolant circuit which flows through the RPV and transfers heat energy to one or more steam generators (heat exchangers) within a secondary circuit. The (lower pressure) secondary circuit comprises a steam turbine which drives a generator for the production of electricity. These components of a nuclear plant are conventionally housed in an airtight containment building, which may be in the form of a concrete structure.

The RPV typically comprises a body defining a cavity for containing the reactor core/fuel assemblies and a closure head for closing an upper opening to the cavity. The closure head may form part of an integrated head package (IHP) (or integrated head assembly) which further comprises a control rod drive mechanism contained within a shroud. The control rod drive mechanism comprises drive rods which pass through the closure head and are connected to control rods contained within the reactor core. The control rods are provided to absorb neutron radiation within the core and thus control the nuclear reactions within the reactor core. The drive rods within the control rod drive mechanism are powered by a power supply to vertically translate to thus raise and lower the control rods within the reactor core.

The reactor core further comprises guide columns for the control rods and these, along with the associated electronics are typically called the "upper internals".

Maintenance and refuelling is an important part of the operation of a nuclear power generation system. Maintenance is required periodically e.g. to replace old and/or damaged parts of the system. Refuelling is required periodically (e.g. every 18-24 months) in order to replace spent fuel rods within the fuel assemblies.

When performing maintenance/refuelling of the reactor core, it is necessary to remove the IHP from the RPV, thereby revealing the reactor core. Once the reactor core is exposed, the upper internals are removed from the reactor core to access the fuel assemblies.

In order to perform maintenance and refuelling operations in a nuclear power generation system, an overhead crane arrangement such as a polar gantry crane having a circular runway is typically provided within the containment structure of the system. Polar cranes are necessarily large, heavy structures in order to allow the lifting of the heavy components of the nuclear power generation system. This makes polar cranes expensive to install.

During refuelling, the polar crane typically lifts the IHP from the RPV body vertically upwards, moves the IHP horizontally away from the RPV body and then lowers it onto a storage stand on the working floor within the containment building. The polar crane is then used to lift the upper internals which typically weigh around 15 to 50 tonnes and are radioactive. The polar crane raises the internals vertically and then horizontally before lowering them into a storage pool of water in which they are submerged. This is to provide gamma shielding around the internals during refuelling.

The reactor vessel body is typically located a significant distance below the working floor of the containment structure in order to provide a refuelling cavity above the exposed reactor core within the reactor vessel body. During removal of the IHP from the reactor vessel body, the drive rods remain connected to the control rods and protrude from the reactor vessel cavity into the refuelling cavity that is flooded with water to contain any radioactive emissions from the drive rods.

The protruding drive rods and the vertical extent of the refuelling cavity drives the necessary lift height of the upper internals by the polar crane as the upper internals have to clear the vertical height of the drive rods/refuelling cavity before being moved horizontally and lowered into the storage pool.

The necessary lift height of the polar crane dictates the height of containment structure (and thus the cost/time associated with the building of the containment structure). The risks associated with dropping the upper internals from any significant vertical height onto the reactor core are very high.

There is a need for an improved nuclear power generation system which mitigates at least some of the problems associated with the known systems.

SUMMARY OF DISCLOSURE

In a first aspect, there is provided a lifting and transport device for lifting upper internals from a reactor core of a nuclear power generation system in a deployment location and transporting them to a storage location, the lifting/transport device comprising:

a device body formed of radioactive shielding material, the device body defining a storage chamber having an open base;

a movable sealing plate formed of radioactive shielding material, the sealing plate being movable between an open position in which the storage chamber is open and a closed position in which the storage chamber is sealed;

a lifting system mounted within the storage chamber having a lifting rig for releasable connection to the upper internals and configured to raise the upper internals to within the storage chamber when the device is in the deployment location and the plate is in the open position; and wheels for guiding movement of the lifting/transport device between the deployment location and the storage location.

By providing a device having a body and sealing plate formed of radioactive shielding material, the upper internals can be contained (and stored at the storage location) within the device after removal from the reactor core thus eliminating the need for the storage pool. When the storage chamber is open (i.e. the sealing plate is in its open position and the device is in the deployment location), the lifting rig can be used to withdraw the upper internals from the reactor core into the storage chamber. This obviates the need for a polar crane for the vertical lifting of the upper internals and thus allows a reduction in the height and construction cost/time of the containment structure. The wheels allow movement (e.g. horizontal movement) of the device (e.g. over a working floor of the containment structure) to move the device (and thus the upper internals) between the deployment location and the storage location. This horizontal movement would previously have been effected by the polar crane.

Optional features of the present disclosure will now be set out. These are applicable singly or in any combination with any aspect of the present disclosure.

In some embodiments, the body may be formed of steel. It may have an upper (substantially horizontal) wall. It may have four (substantially vertical) side walls to form a cuboid storage cavity. Alternatively, it may have a cylindrical wall to form a cylindrical storage cavity. The walls may each be between 100 and 200 mm, e.g. between 120 and 180 mm or between 140 and 160 mm such as around 150 mm thick. Steel walls having a thickness of 150 mm give a radiation shielding equivalent to 1 m depth of water in a storage pool. The walls may be lead-lined.

The sealing plate forms the base of the storage cavity when it is in its closed position. In its closed position, it forms a liquid tight seal against the body to prevent seepage of any radioactive liquid from the device. The sealing plate may be formed of steel. It may have a thickness of between 100 and 200 mm, e.g. between 120 and 180 mm or between 140 and 160 mm such as around 150 mm. The sealing plate may be slidably movable between its open and closed positions.

The sealing plate may be movable (e.g. slidably movable) between its open and closed positions by an actuator that may be actuable by a control system located remotely from the device.

In some embodiments, the lifting system comprises one or more winches/hoists. These may be mounted within the storage cavity on an inside surface of the upper (substantially horizontal) wall. The lifting system may actuable by the control system located remotely from the device.

The lifting system may further comprise a gripper element for connection to the upper internals. For example, the gripper element may be a servo-actuated gripper/pinching element for gripping/pinching a handle provided on the upper internals. The lifting system may comprise one or more sensors (e.g. load sensors) for detecting effective coupling (e.g. of the gripper element) to the upper internals (e.g. to the handle on the upper internals).

The device may further comprise an apertured frame for supporting the body. The wheels may be mounted to the apertured frame. In these embodiments, the aperture in the frame is aligned with the open base of the storage chamber such that, when the sealing plate is in its open position (and the device is in the deployment location), the lifting system can be used to hoist the upper internals through the aperture and the open base.

In some embodiments, the device further comprises a liquid (e.g. water) supply system mounted within the storage chamber for maintaining the moisture levels of the upper internals stored within the device to prevent radioactive vapour from forming and dispersing throughout the containment structure. The supply system may comprise one or a plurality of liquid spray nozzles. The liquid supply system may comprise a recirculation pump. It may comprise a liquid storage tank. In these embodiments with a liquid supply system, the device may further comprise a drainage system for draining the liquid from the device.

In some embodiments, the device further comprises a motor for driving the wheels to effect movement of the device from the deployment to the storage location. The motor may be actuable by the control system located remotely from the device. The wheels may be flanged wheels i.e. having a reduced diameter portion axially sandwiched between two flanges. In this way, the wheels may be configured to be driven along rails/tracks.

The device may be collapsible. That is, the device may be configured to be moveable between a collapsed configuration and an expanded configuration. This may be facilitated, for example, by a structure of the device comprising telescoping, pivoting or hinged components. The device may include actuators for moving the device between its collapsed and expanded configurations. In the collapsed configuration the height and/or width of the device may be less than in the expanded configuration. The device may be movable (e.g. drivable) in the collapsed configuration. In this way, when the device is required to be moved through an opening e.g. into and out of the containment structure, the size of the opening (i.e. to accommodate the device) may be minimised. Thus, the device may be transported in the collapsed configuration and may perform the maintenance operation (i.e. removing the upper internals) in the expanded configuration.

In a second aspect, there is provided a nuclear power generation system comprising a device according to the first aspect and a reactor vessel having:

- a reactor vessel body defining a cavity housing a reactor core containing a control rod assembly and upper internals for guiding the control rod assembly; and
- a closure head configured to seal against the reactor vessel body to close an opening to the cavity.

The nuclear power generation system may be a pressurised water reactor system.

The reactor vessel may comprise an integrated head package (IHP) comprising the closure head, and a control rod drive mechanism housed within a shroud. The control rod drive mechanism comprises at least one drive rod (and preferably a plurality of drive rods) extending through the closure head, the or each drive rod having a coupling element (e.g. a pneumatic coupling element) for releasably coupling to a control rod assembly within the reactor core. The at least one drive rod is movable to a maintenance/refuelling position in which the at least one drive rod is uncoupled from the control rod assembly and at least partially (preferably fully) retracted into the IHP (e.g. into the shroud). The IHP further comprises at least one locking element for locking the at least one drive rod in the maintenance/refuelling position.

This IHP allows the drive rods to be removed from the reactor core along with the IHP. In this way, the need for a flooded refuelling cavity is removed as there will be no radioactive drive rods left protruding from the reactor core.

Accordingly, in some embodiments, the system comprises a containment structure where the working floor of the containment structure surrounds and is substantially vertically aligned with the opening to the cavity.

Given the scale of nuclear power generation systems, the term "substantially vertically aligned" means that the vertical spacing between the working floor and the opening to the cavity (defined by an upper end of the reactor vessel body) is less than 2 metres, e.g. 1 metre or 0.5 metres above the opening to the cavity in the reactor vessel body.

In some embodiments, the working floor comprises at least one pathway extending from adjacent the reactor vessel to the (remote) storage location, the at least one pathway being substantially vertically aligned with the opening to the cavity in the reactor vessel body. The remote storage location may be provided externally to the containment structure e.g. in a shielded annex.

In some embodiments, the at least one pathway may be a linear pathway extending between the reactor vessel body and the storage location. In some embodiments, the at least one pathway may be a substantially horizontal pathway.

In some embodiments, the at least one pathway may comprise tracks or rails extending from between the reactor vessel body and the storage location, the wheels of the device being mounted on the tracks/rails. The tracks/rails may substantially vertically aligned with the opening to the cavity in the reactor vessel body. The use of tracks/rails may facilitate automation of movement of maintenance/refuelling devices along the at least one pathway which, in turn may reduce the number of workers required to perform maintenance/refuelling (which may reduce the safety risks associated with the processes).

The tracks/rails may comprise a removable/temporary portion that extends vertically above the reactor vessel body to allow the positioning of the lifting/transporting device directly over the reactor vessel body/reactor core. Alternatively, the tracks/rails may be spaced from one another by a distance that is greater than the width of the opening to the cavity in the reactor vessel so that the lifting/transporting device can be positioned directly over the reactor vessel body/core.

In some embodiments, the deployment location of the lifting device is vertically above the reactor vessel body. In this way, when the sealing plate is its open position, the lifting system can be extended into the reactor core to engage the upper internals and to hoist them vertically upwards.

In some embodiments, the system comprises a control system for sending control signals for actuation of the slidable sealing plate and/or the lifting system and/or for driving the wheels. The control system (and any associated user interface) may be remote from the reactor vessel.

In some embodiments, the system comprises a draining conduit extending from the drainage system of the device (where provided) to a primary coolant circuit of the system.

In a third aspect, there is provided a method of removing upper internals from an exposed reactor core within a nuclear power generation system according to the second aspect (e.g. for maintenance/refuelling) using the device according to the first aspect.

In some embodiments, the method comprises:

removing the closure head (e.g. the integrated head package) from the reactor vessel body, moving the device to the deployment location vertically above the reactor vessel body (e.g. by driving the wheels of the device along the pathway or tracks/rails) with the sealing plate in its open position;

lowering the lifting rig (e.g. using the at least one winch/hoist) and connecting it to the upper internals;

raising the upper internals vertically to within the storage chamber using the lifting system (e.g. by hoisting with the at least one winch/hoist);

sealing the storage chamber by moving the sealing plate to its closed position; and moving the device to the storage location (e.g. by driving the wheels of the device along the pathway or tracks/rails).

In some embodiments, the method further comprises returning the upper internals to the exposed reactor core (e.g. after maintenance/refuelling) by:

moving the device to the deployment location (e.g. by driving the wheels of the device along the pathway or tracks/rails);

opening the storage chamber by moving the sealing plate to its open position;

lowering the upper internals vertically into the reactor core using the lifting system (e.g. using the at least one winch/hoist);

disconnecting the lifting rig from the upper internals;

raising the lifting rig from within the reactor core to within the storage chamber (e.g. by hoisting with the at least one winch/hoist);

moving the sealing plate to the closed position; and moving the device away from the deployment location (e.g. to the storage location) (e.g. by driving the wheels of the device along the pathway or tracks/rails).

In some embodiments, the method may comprise sliding the sealing plate between its open and closed positions. The method may comprise remote actuation of the moveable sealing plate by a control system located remotely from the device i.e. the method may comprise sending an output signal from the control system to the actuator associated with the sealing plate (e.g. by input at the user interface of the remote control system) to effect movement (e.g. sliding) of the sealing plate.

The method may comprise remote actuation of the lifting system by a control system located remotely from the device. Accordingly, the method may comprise sending an output signal from the control system to the lifting system (e.g. by input at the user interface of the remote control system) to lower the lifting rig for connection to the upper internals. The method may comprise sending an output signal from the control system to the lifting system (e.g. by input at the user interface of the remote control system) to raise the lifting rig after connection to the upper internals.

After refuelling/maintenance, the method may comprise sending an output signal from the control system to the lifting system (e.g. by input at the user interface of the remote control system) to lower the lifting rig and upper internals into the reactor core. The method may comprise sending an output signal from the control system to the lifting system (e.g. by input at the user interface of the remote control system) to raise the lifting rig after disconnection from the upper internals.

In some embodiments, the method further comprises spraying a liquid (e.g. water) onto the upper internals within the storage chamber. In these embodiments, the method may comprise draining the liquid from the device e.g. into the primary coolant circuit of the system.

In some embodiments, the method comprises moving the device between the deployment and storage locations along a working floor of the containment structure (e.g. along a linear, horizontal pathway) that is substantially vertically aligned with the opening to the cavity.

The method may comprise moving the device to and from a storage location provided externally to the containment structure e.g. in a shielded annex.

In some embodiments, the method may comprise driving the wheels of the device along tracks or rails extending between the deployment location and the storage location, the wheels of the device being mounted on the tracks/rails. The tracks/rails may substantially vertically aligned with the opening to the cavity in the reactor vessel body.

The method may comprise moving the device into the deployment location vertically over the reactor vessel body.

The present invention may comprise, be comprised as part of a nuclear reactor power plant, or be used with a nuclear reactor power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80, 100 or 150 bar during full power operations, and pressure may reach 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

The nuclear core may be comprised of a number of fuel assemblies, with the fuel assemblies containing fuel rods. The fuel rods may be formed of pellets of fissile material. The fuel assemblies may also include space for control rods. For example, the fuel assembly may provide a housing for a 17×17 grid of rods i.e. 289 total spaces. Of these 289 total spaces, 24 may be reserved for the control rods for the reactor, each of which may be formed of 24 control rodlets connected to a main arm, and one may be reserved for an instrumentation tube. The control rods are movable in and out of the core to provide control of the fission process undergone by the fuel, by absorbing neutrons released during nuclear fission. The reactor core may comprise between 100-300 fuel assemblies. Fully inserting the control rods may typically lead to a subcritical state in which the reactor is shutdown. Up to 100% of fuel assemblies in the reactor core may contain control rods.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

BRIEF DESCRIPTION OF THE DRAWINGS

Embodiments will now be described by way of example only with reference to the accompanying drawings in which.

DETAILED DESCRIPTION AND FURTHER OPTIONAL FEATURES

Figure 1:
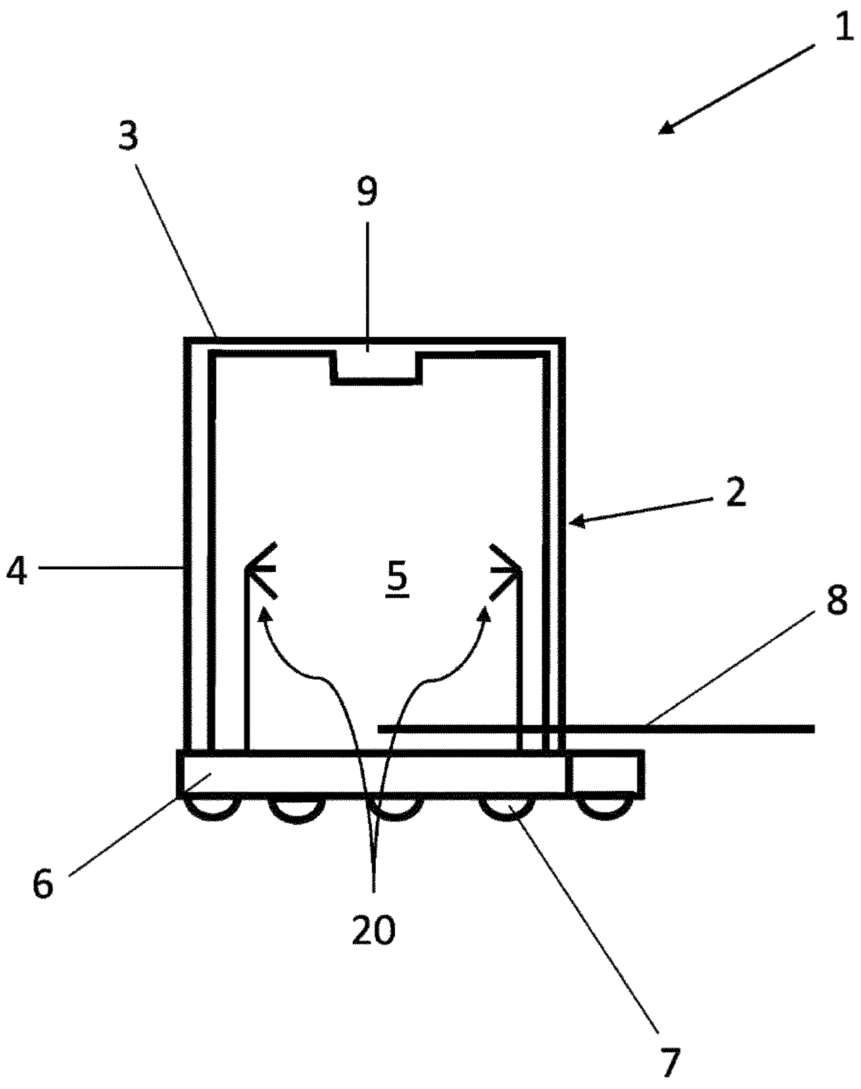
FIG. 1 shows a schematic cross-sectional view through the lifting/transporting device.

FIG. 1 shows a lifting and transport device 1 comprising a device body 2 having a horizontal upper wall 3 and vertical side walls 4. The walls are formed of 150 mm thick steel. The walls 3, 4 define a cuboid storage chamber 5 having an open base. The device body 2 is seated on an apertured frame 6 which has a plurality of flanged wheels 7. The aperture (not shown) in the wheeled apertured frame 6 is aligned with the open base of the device body 2.

The device further comprises a sealing plate 8 which is slidable between an position in which the storage chamber 5 is open (through its open base) and a closed position in which the storage chamber 5 is sealed (in a liquid tight manner) with the sealing plate 8 covering the open base and sealed against the device body 2.

The sealing plate 8 is also formed of 150 mm thick steel and is associated with an actuator (not shown) for driving it between its open and closed positions. The actuator is connected to a control system located remotely from the device. In FIG. 1, the sealing plate 8 is shown mid-way between the closed and open positions.

A lifting system 9 is mounted within the storage chamber 5 and has a lifting rig (not shown) for releasable connection to the upper internals. The lifting rig is connected to two hoists (not shown) for raising and lowering the lifting rig. The lifting system 9 is connected to the remote control system.

The device 1 further comprises a liquid (e.g. water) supply system 20 mounted within the storage chamber 5 for maintaining the moisture levels of the upper internals stored within the device 1 to prevent radioactive vapour from forming and dispersing throughout the containment structure. The liquid supply system may comprise a recirculation pump and a liquid storage tank. In these embodiments with a liquid supply system, the device may further comprise a drainage system for draining the liquid from the device.

Also not shown, there is a motor for driving the wheels 7. The motor may be actuable by the control system located remotely from the device 1. The wheels 7 may be flanged wheels having a reduced diameter portion axially sandwiched between two flanges. The wheels 7 may be arranged in two aligned rows.

Figure 2:
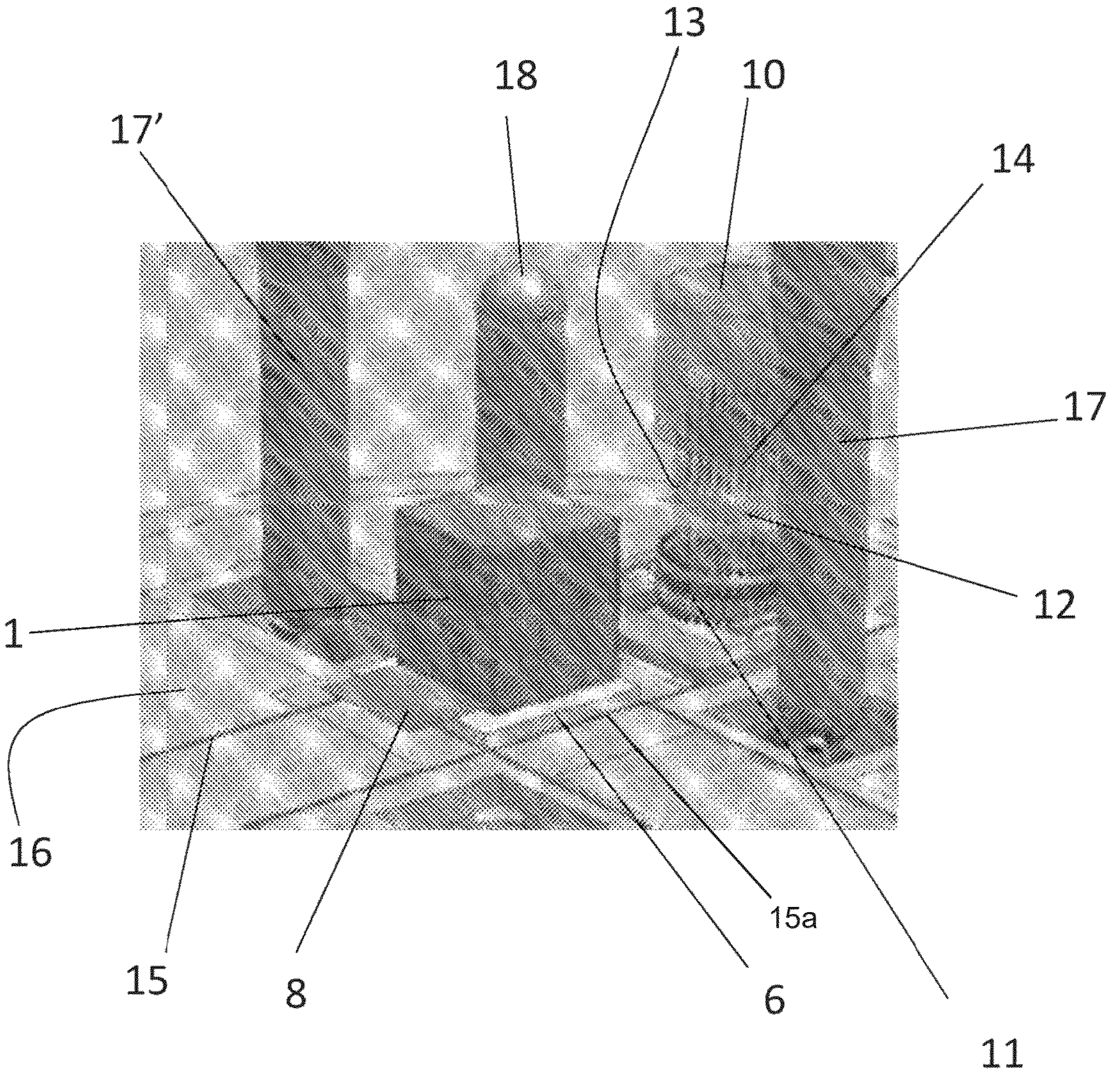
FIG. 2 shows a schematic of the device in the deployment location within a nuclear power generation system.

This device is provided to facilitate the removal (and subsequent replacement) of the upper internals from the reactor core within a nuclear power generation system which is shown in FIG. 2. The system comprises a reactor vessel having a reactor vessel body (not shown) defining a cavity housing the reactor core containing upper internals. The reactor vessel also comprises an integrated head package (IHP) 10 comprising a closure head 11 configured to seal against the reactor vessel body to close an opening to the cavity. The IHP also comprises a control rod drive mechanism 12 housed within a shroud 13. The control rod drive mechanism 12 comprises a plurality of drive rods 14 extending through the closure head 11, the drive rods 14 each having a pneumatic coupling element (not shown) for releasably coupling to a control rod assembly within the reactor core.

The system further comprises a plurality of steam reactors 17, 17' and a pressuriser 18.

In order to expose the reactor core (to allow removal of the upper internals), the IHP 10 must be removed from the reactor vessel body. This is achieved by moving the drive rods 14 to a maintenance/refuelling position in which they uncoupled from the control rod assembly and fully retracted into the shroud 13. The drive rods 14 are locked within the shroud 13 in the maintenance/refuelling position. The IHP 1 is then raised vertically away from the reactor vessel body and moved horizontally out of alignment with the reactor vessel body to an IHP storage location (as shown in FIG. 2).

Next the lifting/transport device 1 is moved from a storage location (e.g. in a shielded annex outside the containment structure) to a deployment location vertically over the reactor vessel body (as shown in FIG. 2). The lifting/transport device 1 is moved to the deployment location along rails/tracks 15 extending along a linear pathway on the containment working floor 16. In some cases, the tracks/rails comprise a removable/temporary portion 15*a* that extends vertically above the reactor vessel body. The liquid supply system may comprise one or a plurality of nozzles. The working floor 16 and rails/tracks 15 are substantially vertically aligned with the opening to the cavity in the reactor vessel body. The tracks/rails 15 allow the positioning of the lifting/transporting device 1 directly over the reactor vessel body/reactor core.

Once in the deployment location, the sealing plate 8 is moved (using a remotely operated actuated e.g. actuated by a user input at the remote user interface forming part of the remote control system) to its open position where the storage chamber 5 is open through its open base. The lifting system 9 lowers the lifting rig into the reactor core through the open base and the aperture in the frame 6. Again, this may be effected automatically from a remote location (e.g. by input of a user input at a user interface at a remote control system).

The lifting rig is (automatically) connected to the upper internals and then the lifting system 9 hoists the lifting rig and the connected upper internals vertically upwards into the storage chamber 5 (through the apertured frame 6 and the open base). Once the upper internals are fully contained within the storage chamber 5, the sealing plate 8 can be (automatically) moved to its closed position where it forms a liquid tight seal with the device body 2.

The lifting/transport device 1 can then be moved (horizontally) away from the deployment location by driving the wheels 7 along the rails/tracks 15. During transport away from the deployment location and/or during storage of the upper internals in the storage location, the liquid supply system may be used to maintain moisture levels of the upper internals.

When refuelling is complete, the device 1 is moved back along the rails/tracks 15 to the deployment location by driving the wheels 7 of the device 1. The storage chamber 5 is opened by moving the sealing plate 8 to its open position. The upper internals are lowered vertically into the reactor core using the lifting system 9 where they are disconnected (automatically). Next the lifting rig is raised from within the reactor core to within the storage chamber 5 using the lifting system 9 and the sealing plate 8 is moved to its closed position. Finally, the device 1 is moved away from the deployment location back to the storage location by driving the wheels 7 of the device 1 along the tracks/rails 15.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nuclear power generation system comprising:

a reactor vessel comprising:

a reactor vessel body defining a cavity housing a reactor core containing a control rod assembly and upper internals for guiding the control rod assembly; and a closure head configured to seal against the reactor vessel body to close an opening to the cavity;

a containment structure comprising:

a working floor which surrounds and is vertically aligned with the opening to the cavity of the reactor vessel, the working floor comprising at least one pathway comprising tracks or rails; and a lifting and transport device adjacent the reactor vessel comprising:

a device body formed of radioactive shielding material, the device body defining a storage chamber having an open base;

a movable sealing plate formed of radioactive shielding material, the sealing plate being movable between an open position in which the storage chamber is open and a closed position in which the storage chamber is sealed;

a lifting system mounted within the storage chamber having a lifting rig for releasable connection to the upper internals and configured to raise the upper internals through the open base to within the storage chamber when the lifting and transport device is in a deployment location and the plate is in the open position; and wheels for driving along the pathway comprising tracks or rails and thereby guiding movement of the lifting and transport device between the deployment location and a storage location.

2. The nuclear power generation system according to claim 1, wherein the tracks or rails comprise a removable portion that extends vertically above the reactor vessel body.

3. The nuclear power generation system according to claim 1 further comprising a control system for sending control signals for actuation of the movable sealing plate and/or the lifting system and/or for driving the wheels.

* * * * *